United States Patent
Zoss et al.

(10) Patent No.: US 10,327,975 B2
(45) Date of Patent: Jun. 25, 2019

(54) RECONFIGURABLE EXOSKELETON

(71) Applicant: Ekso Bionics, Inc., Richmond, CA (US)

(72) Inventors: Adam Zoss, Berkeley, CA (US); Jonathan Evans, Oakland, CA (US); Reuben Sandler, Berkeley, CA (US); Nathan Harding, Oakland, CA (US); Aaron Julin, Oakland, CA (US); James Lubin, Oakland, CA (US); Taylor Heanue, Oakland, CA (US); Dylan Fairbanks, Alameda, CA (US); James Stryker, Mountain View, CA (US)

(73) Assignee: Ekso Bionics, Inc., Richmond, CA (US)

( * ) Notice: Subject to any disclaimer, the term of this patent is extended or adjusted under 35 U.S.C. 154(b) by 764 days.

(21) Appl. No.: 14/649,822

(22) PCT Filed: Dec. 11, 2013

(86) PCT No.: PCT/US2013/074353
§ 371 (c)(1),
(2) Date: Jun. 4, 2015

(87) PCT Pub. No.: WO2014/093470
PCT Pub. Date: Jun. 19, 2014

(65) Prior Publication Data
US 2015/0351995 A1    Dec. 10, 2015

Related U.S. Application Data

(60) Provisional application No. 61/735,816, filed on Dec. 11, 2012.

(51) Int. Cl.
*A61H 1/02* (2006.01)
*A61H 3/00* (2006.01)
*B25J 9/00* (2006.01)

(52) U.S. Cl.
CPC .......... *A61H 1/024* (2013.01); *A61H 1/0244* (2013.01); *A61H 1/0266* (2013.01); *A61H 3/00* (2013.01);
(Continued)

(58) Field of Classification Search
CPC .... A61H 1/024; A61H 1/0244; A61H 1/0266; A61H 3/00; A61H 2201/0107;
(Continued)

(56) References Cited

U.S. PATENT DOCUMENTS 5,052,379 A    10/1991  Airy et al.
5,121,742 A    6/1992   Engen
(Continued)

FOREIGN PATENT DOCUMENTS

CN    2730338      10/2005
CN    201510472    6/2010
(Continued)

OTHER PUBLICATIONS

Farris, "*Design of a Multi-Disc Electromechanical Brake*", Retrieved from the Internet: <URL: http://etd.library.vanderbilt.edu/available/etd-11192009-114523/unrestricted/Thesis_Ryan_Farrris.pdf, Dec. 2009.

*Primary Examiner* — Andrew S Lo
(74) *Attorney, Agent, or Firm* — Diederiks & Whitelaw, PLC.

(57) ABSTRACT

An exoskeleton can be reconfigured, adjusted and/or controlled on the fly utilizing devices which fall into three categories, particularly including a swappable unactuated leg, lockable transverse and coronal hip rotations, and software controlled free joints. More specifically, the first device allows for the creation of a modular joint system in which individual exoskeleton joints or limbs can be changed or swapped to optimize an exoskeleton for a particular user. The second device is concerned with mechanically control- (Continued)

ling, such as locking and unlocking, joints thereby allowing, for example, an exoskeleton leg to pivot or not pivot in an axis that is not actuated. The third device allows an actuated exoskeleton joint to be adjusted on the fly using software to simulate a freely rotating joint. The various devices can be used either alone or in combination to enable any given exoskeleton to be appropriately reconfigured, such as when a patient advances during therapy.

34 Claims, 11 Drawing Sheets

(52) U.S. Cl.
CPC ..... *B25J 9/0006* (2013.01); *A61H 2201/0107* (2013.01); *A61H 2201/165* (2013.01); *A61H 2201/50* (2013.01); *A61H 2201/5002* (2013.01); *A61H 2201/5007* (2013.01); *A61H 2201/5061* (2013.01); *A61H 2201/5064* (2013.01); *A61H 2201/5069* (2013.01); *A61H 2201/5084* (2013.01)

(58) Field of Classification Search
CPC .......... A61H 2201/165; A61H 2201/50; A61H 2201/5002; A61H 2201/5007; A61H 2201/5061; A61H 2201/5064; A61H 2201/5069; A61H 2201/5084; B25J 9/0006
USPC .............................................. 623/32; 601/35
See application file for complete search history.

(56) References Cited

U.S. PATENT DOCUMENTS

| | | | |
|---|---|---|---|
| 5,368,546 A | 11/1994 | Stark et al. | |
| 5,407,420 A | 4/1995 | Bastyr et al. | |
| 5,421,810 A | 6/1995 | Davis et al. | |
| 5,460,599 A | 10/1995 | Davis et al. | |
| 5,658,241 A | 8/1997 | Deharde et al. | |
| 5,711,746 A | 1/1998 | Carlson | |
| 6,589,195 B1 | 7/2003 | Schwenn et al. | |
| 7,041,074 B1 | 5/2006 | Averianov et al. | |
| 7,190,141 B1 | 3/2007 | Ashrafiuon et al. | |
| 7,320,672 B2 | 1/2008 | Turrini et al. | |
| 7,410,472 B2 | 8/2008 | Yakimovich et al. | |
| 8,172,781 B2 | 5/2012 | Oddou et al. | |
| 8,337,441 B2 | 12/2012 | Colditz | |
| 8,366,591 B2 | 2/2013 | Patoglu | |
| 8,801,641 B2 | 8/2014 | Kazerooni et al. | |
| 8,945,028 B2 | 2/2015 | Kazerooni et al. | |
| 8,968,222 B2 | 3/2015 | Kzaerooni et al. | |
| 2004/0049140 A1 | 3/2004 | Doty et al. | |
| 2006/0260620 A1 | 11/2006 | Kazerooni et al. | |
| 2007/0123997 A1* | 5/2007 | Herr | A61F 2/60 623/27 |
| 2008/0161937 A1* | 7/2008 | Sankai | A61H 3/008 623/25 |
| 2008/0287850 A1* | 11/2008 | Adarraga | A61F 5/0102 602/26 |
| 2009/0292369 A1* | 11/2009 | Kazerooni | B25J 9/0006 623/27 |
| 2010/0076360 A1* | 3/2010 | Shimada | A61B 5/1038 602/23 |
| 2010/0204627 A1* | 8/2010 | Kazerooni | A61F 5/00 602/16 |
| 2010/0256537 A1* | 10/2010 | Menga | B25J 9/0006 601/34 |
| 2010/0271207 A1 | 10/2010 | Wang et al. | |
| 2011/0105966 A1* | 5/2011 | Kazerooni | A61H 3/008 601/35 |
| 2011/0264014 A1 | 10/2011 | Angold | |
| 2011/0313331 A1 | 12/2011 | Dehez et al. | |
| 2012/0059296 A1 | 3/2012 | Kompa | |
| 2012/0259259 A1 | 10/2012 | Chugunov | |
| 2013/0158445 A1* | 6/2013 | Kazerooni | A61H 3/00 601/35 |
| 2013/0197408 A1* | 8/2013 | Goldfarb | A61F 5/0102 601/35 |
| 2013/0226048 A1* | 8/2013 | Unluhisarcikli | A61H 3/00 601/34 |
| 2013/0289452 A1 | 10/2013 | Smith et al. | |
| 2013/0303950 A1 | 11/2013 | Angold et al. | |
| 2013/0331744 A1* | 12/2013 | Kamon | A61H 3/00 601/35 |
| 2014/0142475 A1* | 5/2014 | Goldfarb | A61H 3/00 601/35 |
| 2015/0025423 A1* | 1/2015 | Caires | A61H 1/024 601/35 |
| 2015/0045703 A1* | 2/2015 | Strausser | A61H 3/00 601/35 |

FOREIGN PATENT DOCUMENTS

| | | |
|---|---|---|
| CN | 101810532 | 8/2010 |
| CN | 201840552 | 5/2011 |
| CN | 201861910 | 6/2011 |
| CN | 102113949 | 7/2011 |
| WO | WO 2009/125397 | 10/2009 |
| WO | WO 2011/127421 | 10/2011 |

* cited by examiner

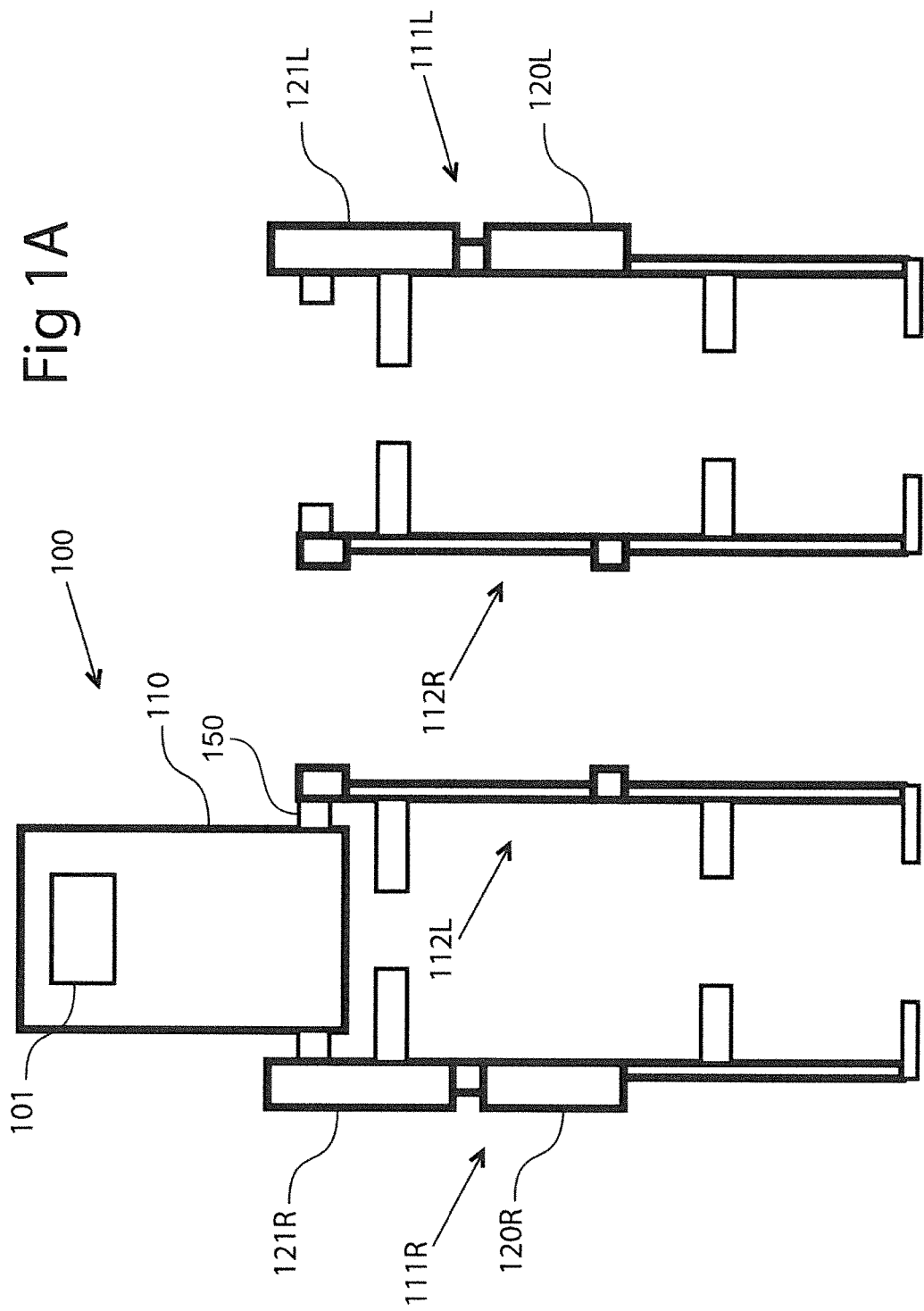

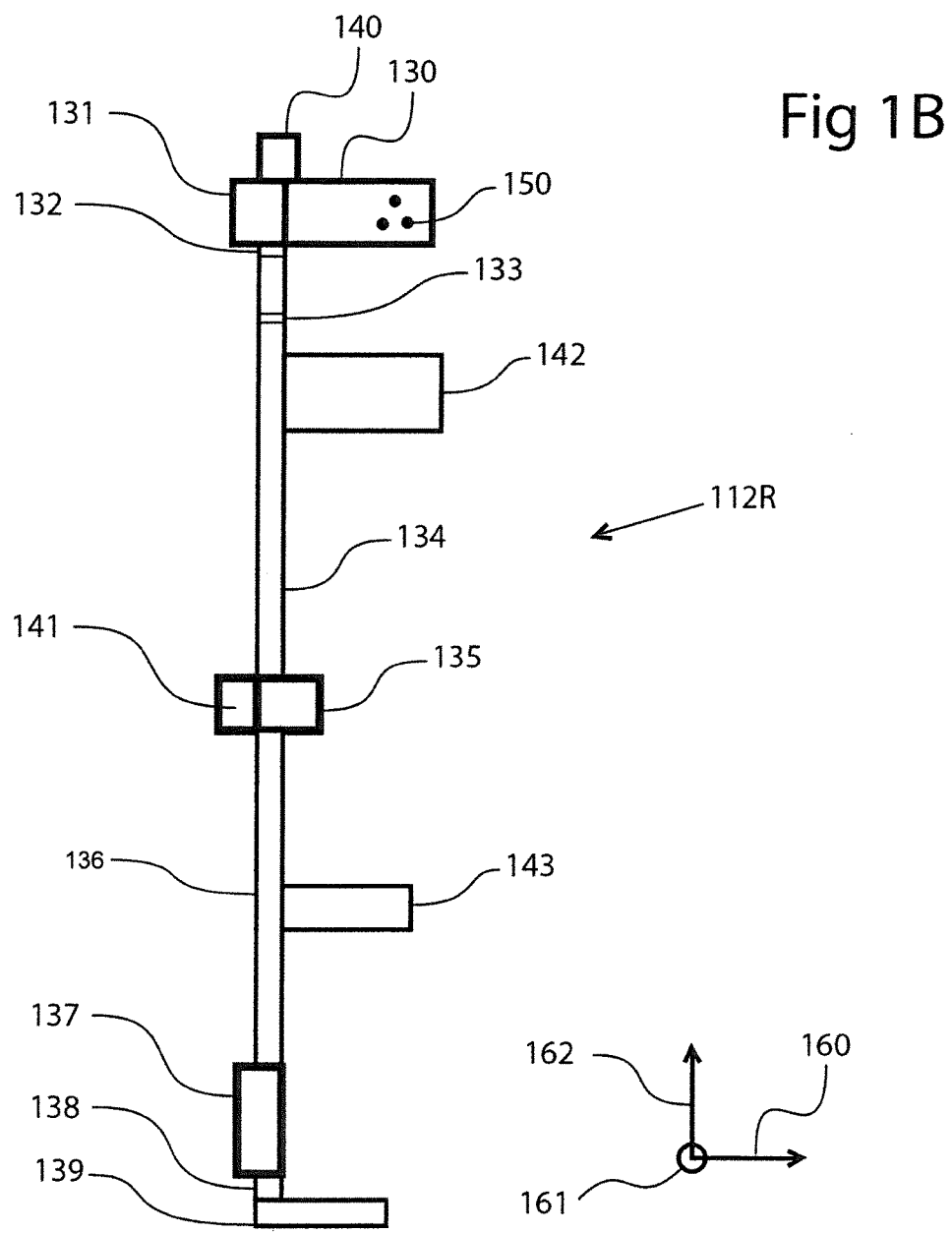

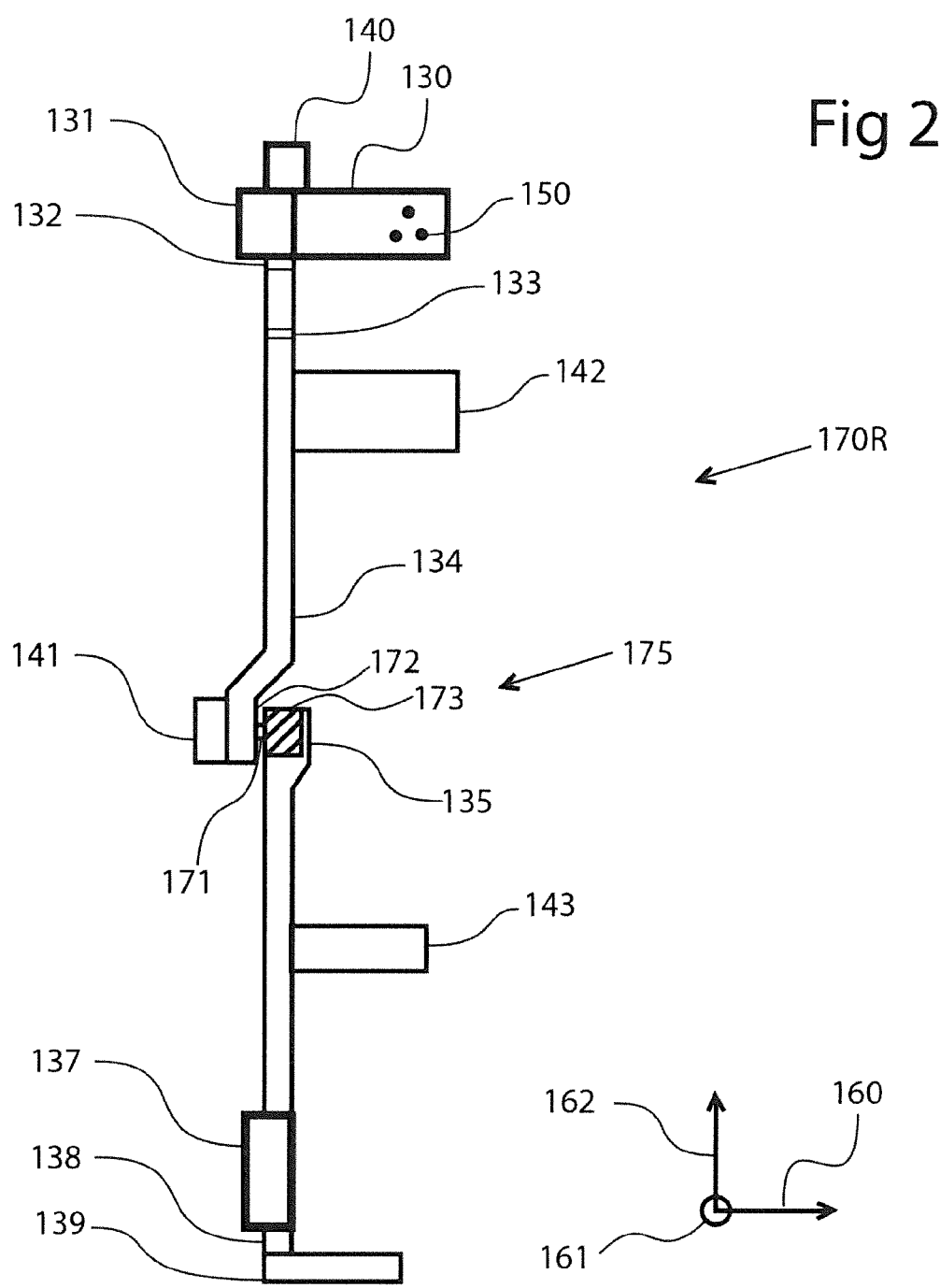

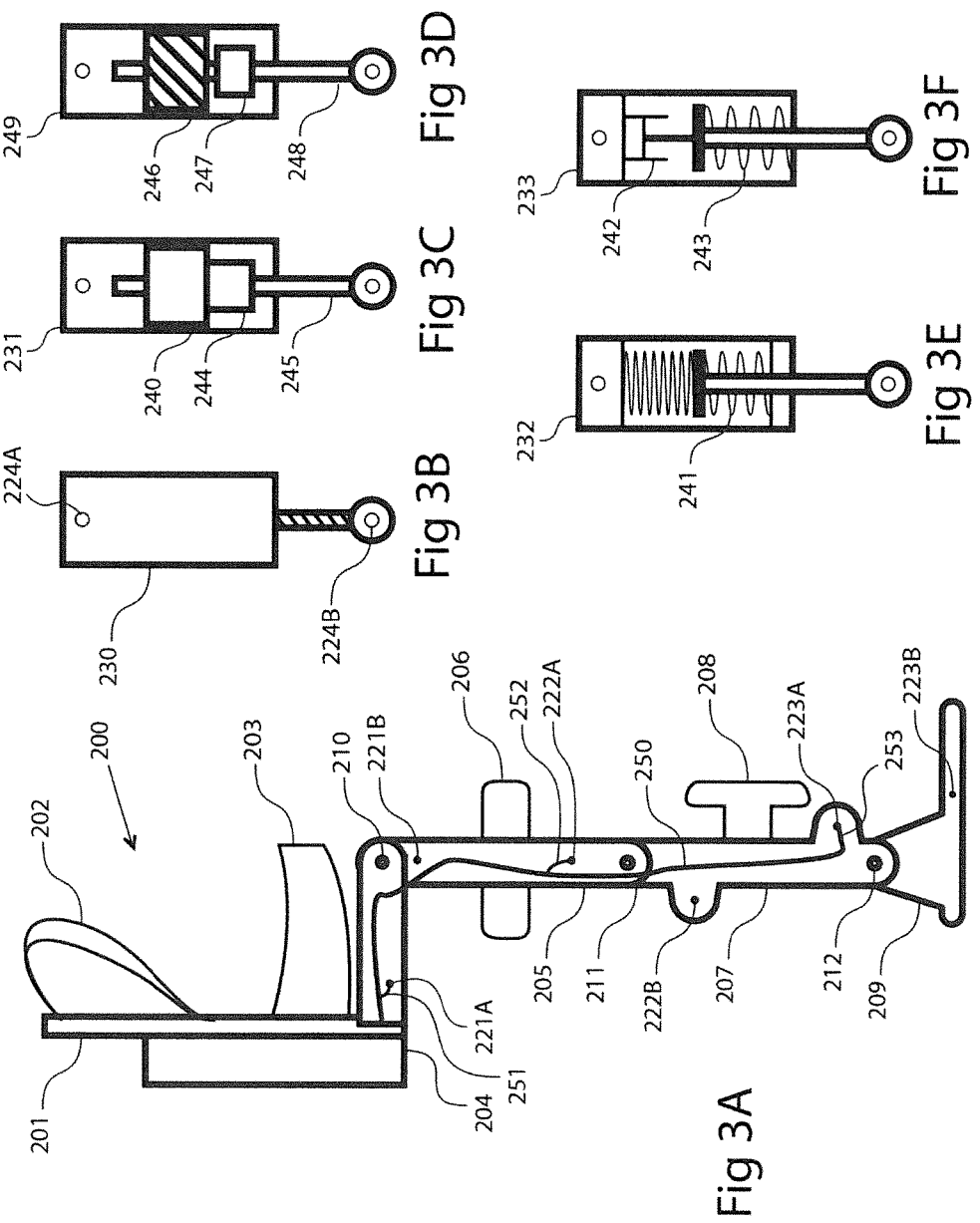

RECONFIGURABLE EXOSKELETON

CROSS-REFERENCE TO RELATED APPLICATIONS

The present application represents a National Stage application of PCT/US2013/074353 entitled "Reconfigurable Exoskeleton" filed Dec. 11, 2013, which claims the benefit of U.S. Provisional Patent Application Ser. No. 61/735,816 filed Dec. 11, 2012 and entitled "Reconfigurable Exoskeleton".

BACKGROUND OF THE INVENTION

In the art of powered lower extremity exoskeletons, especially where at least two degrees of freedom of the exoskeleton leg are actuated, the main application has been helping persons with complete lower extremity paralysis walk. Several devices have been or are being commercialized for this application. Nevertheless, these devices have generally neglected a larger population of persons with impaired lower extremity function, particularly persons who have survived a stroke. Stroke survivors often exhibit hemiparetic injuries, where one limb is much more severely impaired than the other. While some devices have been designed that provide one powered degree of freedom, such as a powered knee brace, these devices can only help those with more mild injuries, and cannot accommodate as severely impaired a person as a full exoskeleton. Furthermore, these devices result in a significant weight borne by the person on their less impaired leg, which must support the weight of the device when the more impaired leg is in swing; this effect is compounded for heavier devices with two or more degrees of freedom. Finally, the out-of-plane axes in powered lower extremity exoskeletons known in the art are locked, something essential for persons who are completely paralyzed, but that is restrictive for persons who are hemiplegic.

It is seen that there is a need in the market for a versatile rehabilitation exoskeleton that can be used for various handicapped individuals, particularly those with either hemiplegic or paraplegic injuries. This application is concerned with several novel embodiments that overcome these limitations to create a truly versatile and commercially viable general rehabilitation exoskeleton. These several embodiments may be used singly, or combined to greater effect.

Although the devices and concepts disclosed here apply equally to devices that work with a person's upper extremities, lower extremities, or both, the discussion here will be focused on devices used for the lower extremities. The determination of which joints (or degrees of freedom) to actuate, which joints to allow to rotate freely, which joints to passively control (using elastic and/or damping systems), and which joints to fix is made based on the needs of each exoskeleton user. This determination is one of the primary factors limiting the intended user population of an exoskeleton device; for example if a joint is fixed and a user requires the joint to freely rotate the user cannot use the exoskeleton device. Therefore, in order to build an exoskeleton which can serve a greater intended user population it is beneficial if the joint control method can be adjusted to the needs of each exoskeleton user on the fly by the end user.

SUMMARY OF THE INVENTION

The invention concerns a lower extremity exoskeleton that is configured to be coupled to a person having distinctive right and left side body capabilities. For this purpose, the lower extremity exoskeleton includes asymmetrically constructed or controlled right and left leg supports configured to be coupled to the person's lower limbs, wherein each leg support is configured to rest on the ground during a stance phase and includes a thigh link and a shank link interconnected by a knee joint, as well as an asymmetrically constructed or controlled exoskeleton torso configured to be coupled to the person's upper body and rotatably connected to each of thigh links of the leg supports through respective sagittal hip joints. A first torque modifier is coupled across the knee joint of one of the right and left leg supports, while a second torque modifier is coupled to the hip joint of the same one of the right and left leg supports. The first and second torque modifiers provide for distinct regulation of right and left side portions of the lower extremity exoskeleton to compensate for the distinctive right and left side body capabilities of the person.

Disclosed here are several devices that function as the first and second torque modifiers and which allow an exoskeleton joint to be adjusted and controlled on the fly by the end user, thereby enabling an increased intended user population to use a particular exoskeleton device. These devices fall into three categories. The first device described allows for the creation of a modular joint system in which individual exoskeleton joints or limbs can be changed or swapped to optimize an exoskeleton for a particular user. The second device described allows an actuated exoskeleton joint to be adjusted on the fly by using software to simulate a freely rotating joint. Multiple embodiments of this method are described including paranormal embodiments that allow the exoskeleton joint to feel frictionless and even the exoskeleton braces to feel weightless and massless. The third device is a pair of mechanically unlocking joints that allow an exoskeleton leg to pivot or not pivot in an axis that is not actuated. The first unlocking joint is a specific mechanical solution which allows a tubular axially rotational exoskeleton joint to be switched between fixed, and freely rotating with an integral independently locking length adjustment. The second unlocking joint is a specific mechanical solution which allows a rotational joint to be switched between fixed and freely rotating with an integral adjustment of the angle of the fixed joint position and an integral hard-stop when in free rotation state. Collectively, these structures and methods allow the exoskeleton designer to create an exoskeleton with a greatly expanded intended user population.

Overall in accordance with the invention, the devices of the invention can be employed singly or in combination in a commercialized product. In any case, additional objects, features and advantages of the invention will become more fully apparent based on the detailed discussion set forth below, particularly with reference to the accompanying drawings wherein like reference numerals refer to corresponding parts in the several views.

BRIEF DESCRIPTION OF THE DRAWINGS

FIG. 1A illustrates exoskeleton systems having one or more modular joints or appendages.

FIG. 1B is a side view of an exoskeleton system of FIG. 1A.

FIG. 2 is a side view of a modular exoskeleton appendage having an electromechical knee brake.

FIG. 3A is a schematic side elevational view of a lower body exoskeleton system.

FIG. 3B illustrates a first embodiment of a joint module used with the lower body exoskeleton system of FIG. 3A.

FIG. 3C illustrates a second embodiment of a joint module used with the lower body exoskeleton system of FIG. 3A.

FIG. 3D illustrates a third embodiment of a joint module used with the lower body exoskeleton system of FIG. 3A.

FIG. 3E illustrates a fourth embodiment of a joint module used with the lower body exoskeleton system of FIG. 3A.

FIG. 3F illustrates a fifth embodiment of a joint module used with the lower body exoskeleton system of FIG. 3A.

DETAILED DESCRIPTION OF THE INVENTION

Extensive testing performed with stroke patients done under a human subject protocol suggested that stroke patients with a chronic injury can benefit from an exoskeleton where the legs may be swapped so that only one side of the exoskeleton is actuated. This knowledge led to a first category of modular systems incorporating torque modifiers in accordance with the invention as will now be described. In general, the first embodiment allows a single exoskeleton to enable paraplegics to walk and aid in the gait training of stroke patients. These two populations are best served by different configurations of an exoskeleton device. A complete paraplegic may lack any muscular control below a certain level; in this case each degree of freedom of the person must be controlled—either with a motor, a passive element such as a spring or a damper, or by simply locking the degree of freedom altogether. Conversely, a stroke patient may have a less affected side with almost normal muscular control; in this case as many degrees of freedom as possible should not be controlled so that the person's gait and balance on their less affected side are not encumbered. While these concepts are being described specifically for the user combination of paraplegic mobility and stroke rehabilitation, the features disclosed can be applied to a wide range of possible user combinations for a single exoskeleton.

Modular Exoskeleton Systems

A first aspect of the invention concerns an exoskeleton system wherein one or more of the joints, or entire exoskeleton appendages, are modular in construction such that different versions of the joint, or exoskeleton appendage, can be installed on the fly by the end user on a single exoskeleton device. This approach allows the greatest flexibility because a joint or exoskeleton appendage can be entirely optimized for a specific user population. Furthermore, the exoskeleton can often be cheaper and lighter because motors not needed for a particular patient need not be installed. The drawback of this approach is that multiple versions of the exoskeleton joint or exoskeleton appendage must be provided.

Figure 1C:
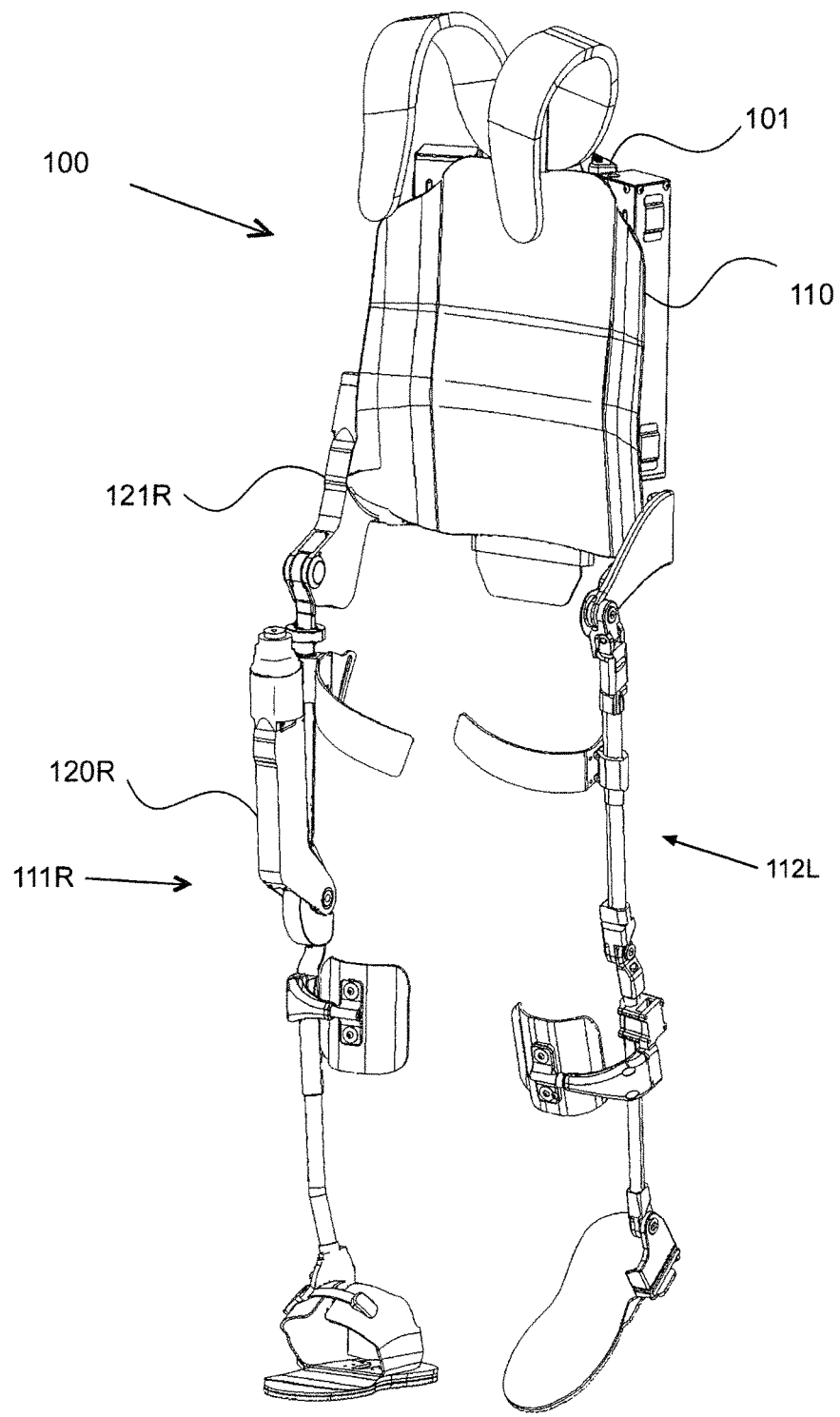
FIG. 1C is a perspective view of an exoskeleton system constructed according to an embodiment of the invention.

As shown with reference to FIGS. 1A, 1B, and 1C, exoskeleton 100 has four legs, actuated legs 111R and 111L and unactuated legs 112R and 112L, with only two legs connected at any one time. Actuated legs 111R and 111L are similar to those known in the art, and in this embodiment comprise actuated knees and hips. As an example, left actuated leg 111L is shown to comprise hip actuator 121L and knee actuator 120L, while right actuated leg 111R is shown to comprise hip actuator 121R and knee actuator 120R. However, in this embodiment, exoskeleton 100 further includes unactuated legs 112R and 112L. Either actuated or unactuated legs may be attached to torso 110 with connection 150 (provided that the chirality of a given leg is appropriate to the side of torso 110 to which the leg will be attached). Although connection 150 can be constituted by a simple bolted connection, various other mechanical means of connecting a leg to torso 110 are also possible. Furthermore, electrical connections between the legs and torso 110 would also be provided, typically with an electrical connector, and these connections are not diagrammed in these Figures. In some embodiments, connection 150 may incorporate both the structural and electrical connections.

The features of the unactuated leg will now be described in detail with reference to left unactuated leg 112L, but it should be understood that right unactuated leg 112R will contain substantially the same components with the opposite chirality where appropriate. FIG. 1B presents a frontal view of unactuated leg 112R and the coordinate convention used throughout the document, with arrow 160 orthogonal to the sagittal plane, arrow 161 orthogonal to the coronal plane, and arrow 162 orthogonal to the transverse plane. Unactuated leg 112L includes hip link 130 that connects to torso 110 at connection 150. Hip pivot 131 rotatably connects hip link 130 to thigh link 134 in the sagittal plane. Hip pivot 131 further includes hip orientation sensor 140 in communication with exoskeleton controller 101 (FIG. 1C) to measure the relative motion of hip pivot 131. Just below hip pivot 131, hip abduction pivot 132 allows abduction of the leg within a set range of motion. In general, abduction pivot 132 includes range of motion stops that prevent excessive adduction during stance so that the moment generated by torso 110 during single stance is transferred to leg 112L rather than going through the person wearing exoskeleton 100. Below abduction pivot 132 is hip rotation 133, which allows rotation in the transverse plane. Typically, hip rotation 133 includes limit stops to prevent excessive rotation of the user's leg. In practice, we have found a range of 5 degrees inward and 30 degrees outward rotation is appropriate. Thigh link 134 includes thigh interface strap 142 which couples the thigh of the person to exoskeleton leg 112L. Knee pivot 135 rotatably connects thigh link 134 to shank link 136. Knee pivot 135 includes knee orientation sensor 141 in communication with exoskeleton controller 101 to measure the relative motion of knee pivot 135. Shank link 136 further includes shank interface strap 143 which couples the shank of the person to exoskeleton leg 112L. Ankle pivot 137 rotatably connects shank link 136 to foot link 139. In some embodiments, there may be an ankle orientation sensor (not shown) configured to communicate the orientation of ankle pivot 137 to controller 101. An ankle orientation sensor can be particularly desirable if ankle pivot 137 does not have any resistance to motion. In such instances, the ankle angle may be large and relevant to the calculations required for controller 101 to produce a natural walking gait with powered right leg 111R. Finally, in some embodiments, ankle resilient element 138 may be placed between ankle pivot 137 and foot link 139 to provide slight abduction freedom at the ankle in the frontal plane. In the preferred embodiment, ankle resilient element 138 is a thin block of stiff rubber. This allows some slight motion in all degrees of freedom, providing foot link 139 some additional ability to sit flatly on the support surface despite loads from the weight of the remainder of the exoskeleton. It will be obvious to one skilled in the art that ankle resilient element 138 could also be another type of spring, such as a metal die spring, or a carbon leaf spring.

In a further embodiment, illustrated in FIG. 2, lockable leg 170R is shown. Most features of leg 170R are shared with leg 112R, expect for a different knee configuration containing electromechanical brake system 175. In the knee of lockable leg 170R, coil 173 may be energized, pulling thigh link 134 along knee pin 171 so that contact surface 172 of thigh link 134 engages coil 173. So doing causes motion of knee pivot 135 to cease so that shank link 136 and thigh link 134 do not rotate with respect to one another. This configuration is useful, because it allows leg 170R to bear weight in stance when coil 173 is energized, better supporting torso 110, but also allowing knee pivot 135 to rotate freely when coil 173 is de-energized in swing. This configuration is rather simple, but means of designing electromechanical brakes for such applications are well understood in the art, and many improvements are possible. For example, by further utilizing a spring, the default state of electromechanical brake system 175 could be locked, so that coil 173 must be energized to unlock the brake system, resulting in a failsafe brake that engages when power to the system is lost.

This embodiment allows an exoskeleton leg to be provided that is optimized for use within a particular exoskeleton user population. The concept was primarily developed to allow an exoskeleton leg appendage with no actuation and additional freely rotating degrees of freedom to be installed on the less affected side of a stroke user during gait training to optimize rehabilitative benefit: on the less affected side the adduction/abduction movement can be allowed to freely rotate, the thigh rotation can be allowed to freely rotate, and the hip, knee and ankle joints can be unactuated and allowed to freely rotate. Furthermore, because there are no actuators on the leg, the leg is lighter and cheap to manufacture. Finally, having the unactuated leg on the less affected side (as opposed to having no exoskeleton leg on the less affected side at all) helps transfer the weight of the exoskeleton torso and actuated leg to the ground when the unactuated leg is in contact with the ground. In practice, a therapist could swap a free leg in for an actuated leg on either the right or left side between patient sessions. Certainly, at this point, it should be recognized that this concept can also be applied to a multitude of other intended user populations, as well as upper body exoskeletons such as an exoskeleton arm appendage, without departing from the invention.

Another aspect of the invention that provides greater flexibility to the device operator is shown in FIG. 3A wherein a lower body exoskeleton 200 is configured to enable the end user to disconnect and reconnect one or more exoskeleton joint modules individually from exoskeleton structural segments. Here, the exoskeleton joints are swapped individually and the modular component is the exoskeleton joint. Consider exoskeleton 200, which is comprised of torso frame and pelvis 201, control electronics 204, human upper body interface straps 202 and 203 configured to connect torso frame and pelvis 201 to the upper body of the human, torso frame and pelvis 201 further being rotatably connected to thigh member 205 with hip pivot 210, shank link 207 being rotatably connected to thigh member or link 205 with knee pivot 211, and foot link 209 being rotatably connected to shank link 207 with ankle pivot 212. Thigh member 205 and shank link 207 have, respectively, thigh interface strap 206 and shank interface strap 208 to connect exoskeleton 200 to the person at those locations. Each pivot is structural and does not include actuation, but does include a corresponding mounting hole on the links on either side of the pivot. That is, hip pivot 210 includes hip holes 221A and 221B; knee pivot 211 includes knee holes 222A and 222B; and ankle pivot 212 includes ankle holes 223A and 223B, where A indicates the proximal hole and B indicates the distal hole.

Exoskeleton 200 is further provided with multiple of joint modules, such as joint module 230 of FIG. 3B, which includes mounting pins 224A and 224B, and which are configured to be mounted to any pair of mounting holes that correspond to the same pivot, i.e., actuator 230 could be mounted between hip holes 221A and 221B, allowing joint module 230 to control the torque and motion of exoskeleton 200 at hip pivot 210. There may be any number of types of joint module 230; FIG. 3C shows motor joint module 231 having electric motor 240 configured to turn ball nut assembly 244, producing linear motion of screw 245; FIG. 3D shows brake module 249 having coil 246 that engages ball nut 247, preventing rotation and stopping motion of ball screw 248; FIG. 3E shows a spring joint module 232 having two opposed springs 241; and FIG. 3F shows a damper joint module 233 having a damper 242 and a spring 243. A device operator can configure exoskeleton 200 to have any different combination of joint modules depending on what is appropriate for a particular patient. In order to provide coordination between various joint modules, exoskeleton 200 further includes an electrical cable harness 250, which further includes connection points coincident with the proximal holes for each joint, respectively electrical connection points 251, 252, and 253 for the hip, knee, and ankle proximal holes 221A, 222A, and 223A. The choice of the proximal hole is not required, but is generally advantageous since the proximal hole will require the cable going to the controller to cross one fewer axis. In some embodiments, the electrical connection points may be adjacent to the holes rather than coincident with them. Electrical cable harness 250 includes power and signal lines, providing power and communication from control electronics 204 to each of the joint modules that may be connected to exoskeleton 200. Such cabling harnesses are well understood in the art and are not an object of this invention, but are simply disclosed here to illustrate an embodiment of the invention. Joint modules containing purely passive elements such as springs and dampers may nonetheless have electrical and data connections, either to provide pass-through to more distal joints or to provide sensor information about the joint to control electronics 204. Sensors may include, without limitation, position sensors such as encoders, LVDTs, or potentiometers, force sensors such as strain gauges, inertial sensors such as accelerometers and gyroscopes, or any of a number of other sensors known in the art.

Individual joint swapping allows operation with varying actuation powers or ranges of motions, free rotation, passive control through springs and/or dampers, or fixed configurations. With individual joint swapping a single exoskeleton device could serve a broad intended user population across users with highly varied needs. Based on this disclosure, methods of creating exoskeleton joint modules in each singular configuration (eclectically actuated, passively controlled with elements such as springs or dampers, or fixed) will be readily apparent to a person skilled in the art of exoskeleton design; without an additional exoskeleton joint installed the default joint type would be free rotation. Because the exoskeleton frame is always present, the frame may include hard stops to prevent movement past typical ranges of motion. In some embodiments, the frame may have fewer pivots. For example, exoskeleton 200 might incorporate only one leg having only hip pivot 210, knee pivot 211, and the associated links, but does not include a second leg, foot link 209, or ankle pivot 212.

Figure 4:
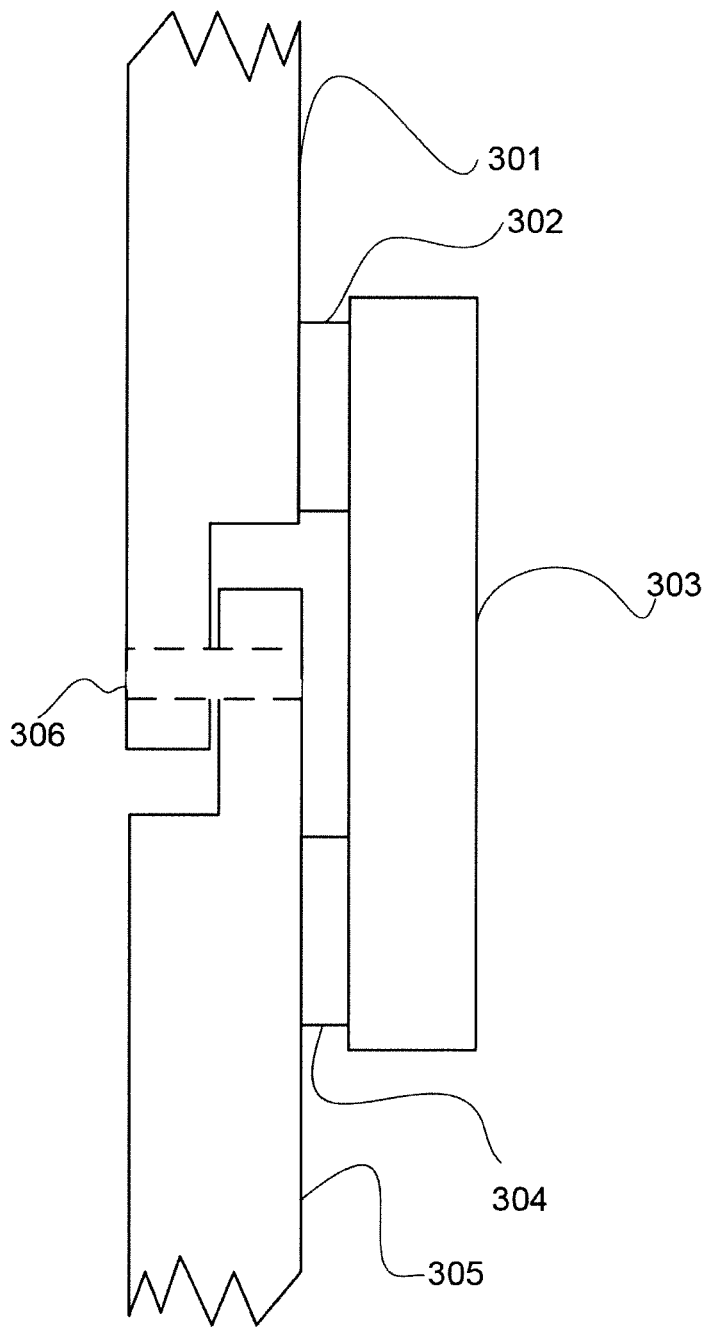
FIG. 4 illustrates an exemplary exoskeleton connection arrangement in accordance with the invention.

One benefit of this arrangement is that it is possible to maintain the exoskeleton's structural connection between the exoskeleton segments (exoskeleton torso, thigh segment, shank segment, and foot segment) if the exoskeleton joints are added over the exoskeleton structure to provide the desired exoskeleton control. FIG. 4 provides a generic diagram of this arrangement. Two exoskeleton segments 301 and 305 are joined by a joining element 306 which could be bearings, a flexural connection, or even a sliding connection between the segments. Exoskeleton joint module 303 is connected to segments 301 and 305 through structural and electrical connections 302 and 304. Joint module 303 may contain active elements, such as an electric motor, one or more passive elements such as a spring, or both. In some embodiments, the joint module may not be in the sagittal plane; for example, the exoskeleton frame could include a pair of hip abduction joints (i.e., joints allowing motion in coronal plane). In a first configuration of such joints, a stiff spring joint module could be installed to provide slight motion under load; this arrangement could be advantageous for a person wearing the exoskeleton who has some hip abductor control. In a second configuration an actuated joint module could be swapped for the stiff spring joint module to provide greater control over the hip abduction to the control computer, something advantageous if great precision of control is desired. In a third configuration, where the person wearing the exoskeleton has good hip abductor strength, a free joint module that only includes an encoder to measure the abduction angle could be swapped in. This example is meant to be illustrative of the utility of this embodiment in therapy, but it is not intended to be limiting.

It is further possible to combine several of these embodiments in an exoskeleton device including one or more swappable appendages or appendage segments and which also include one or more swappable individual joints. In this embodiment the exoskeleton appendages or segments would be swapped to conform to different user sizes and the exoskeleton joints would be swapped to provide varying joint characterizes to serve the user's needs. This approach would be applicable in the production of personal exoskeleton devices for specific users. With this approach the exoskeleton structure could be made to custom fit to the user and the joints could be added as standard components based on the user's needs. By separating the exoskeleton structure from the joint control methods the cost of custom exoskeletons could be reduced with the drawback of somewhat larger form factor.

Virtual Free Axes

A further aspect of the invention which is compatible with those disclosed above is concerned with enabling a user to switch control of one or more actuated exoskeleton joints such that the actuated joints simulate either free joint characteristics or actuated characteristics without modification to the underlying exoskeleton. This concept allows for a single exoskeleton system, and exoskeleton control algorithm, to be used in the rehabilitation of users with broadly varying needs. For example, if a user only has muscle problems in a single joint, the exoskeleton user can set all other joints to free. This is highly applicable to stroke rehabilitation therapy in a clinical setting where it is desired by the clinician to quickly adjust the device for use in the rehabilitation of patients with left or right side affected physiology; the less affected side is desired to move freely without actuation. In this application, a single exoskeleton can provide benefit to a patient population that previously required two exoskeletons (one for left affected patients and one for right affected patients). If the same exoskeleton is additionally used for paraplegic gait therapy, with all joints rigidly actuated, a single exoskeleton can serve a patient population that previously required three exoskeletons: Paraplegic gait therapy, right side affected stroke gait rehab, and left side affected stroke gait rehab. While methods for reducing the effort required to back drive a robotic axis are understood, the art has not realized that these methods have great utility in producing an exoskeleton that can be reconfigured for different gait pathologies.

Figure 5:
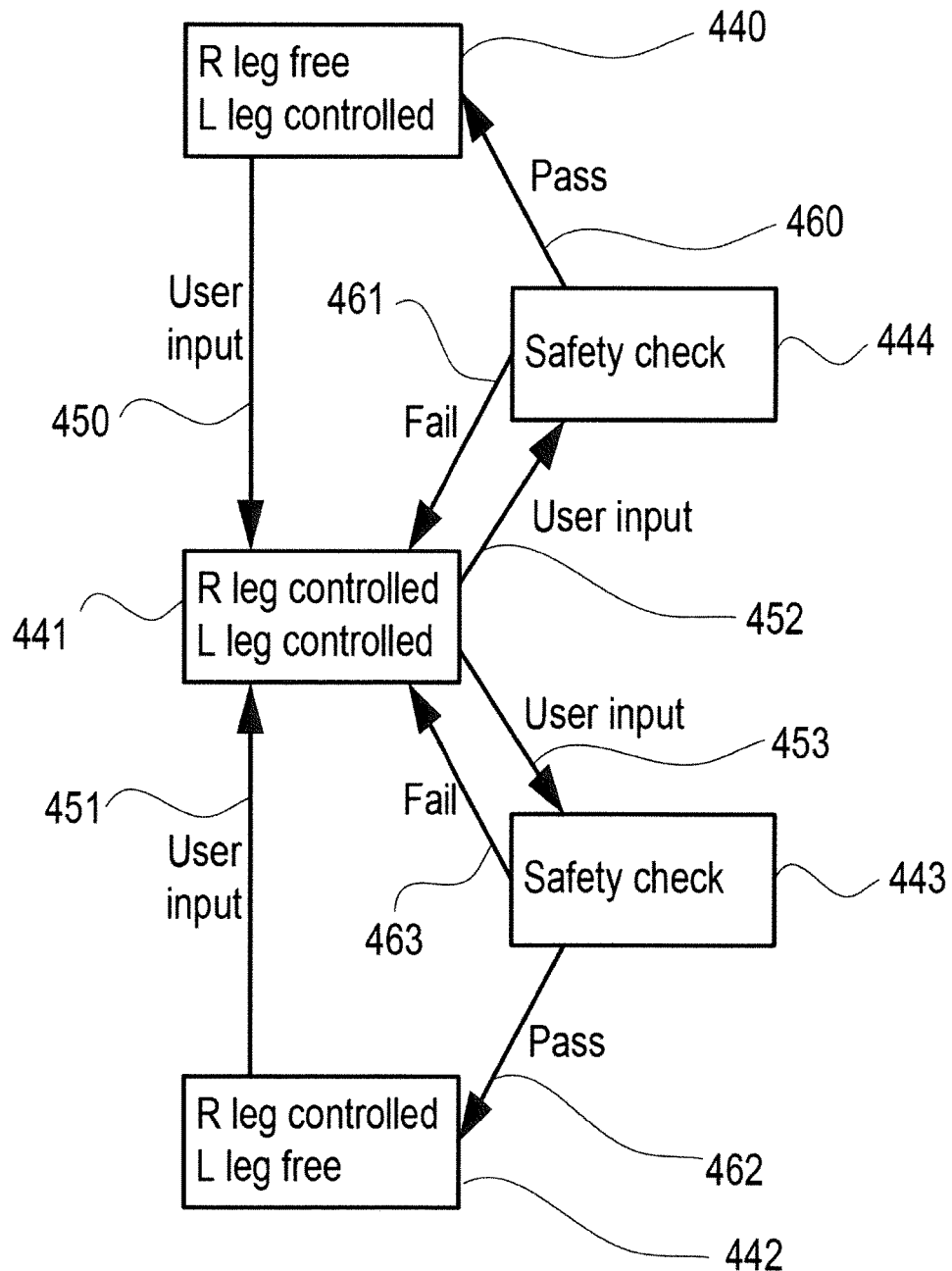
FIG. 5 illustrates a control algorithm employed in connection with the invention.

With reference to FIG. 5, the exoskeleton controller begins in bilateral control state 441 in which the gait of both the left and right legs are controlled. The operator of the exoskeleton signals the exoskeleton controller that they would like to free the left leg of the exoskeleton though a user interface. The controller executes transition 453 to enter state 443. In state 443 the exoskeleton controller checks that it is safe to free the left leg. In some embodiments, the exoskeleton controller might perform this safety check by verifying that the weight is not on the left leg, that the left foot sensor does not indicate the person wearing the exoskeleton is not putting weight on their left leg, or that the exoskeleton is leaning away from the left leg. If the exoskeleton controller determines that the sensor information does not meet safety check 443, it will take transition 463, returning the exoskeleton controller to double control state 441. If the exoskeleton controller determines that the sensor information does meet safety check 443, it will take transition 462, entering left leg free state 442. In left leg free state 442, the exoskeleton controller will control the actuators of the left leg to produce as little resistance as possible, but continue to control the gait of the right leg. When the operator of the exoskeleton signals the exoskeleton controller that they would like the exoskeleton to control the gait of both the right and left legs, the exoskeleton controller takes transition 451 to return to bilateral control state 441. Similarly, if the operator of the exoskeleton signals the exoskeleton controller that they would like to free the right leg of the exoskeleton though a user interface. The controller executes transition 452 to enter state 444. In state 444 the exoskeleton controller checks that it is safe to free the left leg. In some embodiments, the exoskeleton controller might perform this safety check by verifying that the weight is not on the left leg, that the left foot sensor does not indicate the person wearing the exoskeleton is not putting weight on their left leg, or that the exoskeleton is leaning away from the left leg. If the exoskeleton controller determines that the sensor information does not meet safety check 444, it will take transition 461, returning the exoskeleton controller to double control state 441. If the exoskeleton controller determines that the sensor information does meet safety check 444, it will take transition 460, entering right leg free state 440. In right leg free state 440, the exoskeleton controller will control the actuators of the right leg to produce as little resistance as possible, but continue to control the gait of the left leg. Again, the operator may signal the exoskeleton to reenter bilateral control, the exoskeleton controller takes transition 450 to return to bilateral control state 441.

Methods of joint actuation such that a joint simulates free characteristics are readily apparent to a person skilled in the art of control systems. The primary method is to servo the joint to zero torque. Additionally, joint friction, weight, and inertia can be removed making the joint (and, potentially, exoskeleton segment) feel to the person wearing the exoskeleton as though it is not present. Methods of joint actuation in which friction, weight and inertia are removed can be readily achieved through model development as commonly employed in digital control systems. The primary difficulty in doing so is that in exoskeleton designs, there is typically a high transmission ratio between the joint torque and the electric motor that ultimately generates motion because electric motors at the size required provide too little torque at too much speed. Alternatively, an equivalent effect may be achieved by placing force sensors at all interfaces between the patient and the device and control the device to minimize these forces.

In a preferred embodiment, a highly backdrivable actuator, such as a ball screw, is used without measuring output force. That is, force sensors are not necessary if the actuator is backdrivable as the friction in the transmission of the actuator allows the actuator to be driven by forces applied at the actuator output. For such actuators, the primary elements preventing the person from backdriving the exoskeleton are the viscous damping and rotary inertia of the electric motor upstream of the transmission. In this case, it is simply necessary to electronically control the actuator to reduce these effects, i.e., estimate the motor velocity and angular acceleration and add a toque proportional to these estimates to the torque commanded to the motor. If this is done, the person backdriving the exoskeleton actuator does not feel the inertia and viscous damping, and this is sufficient for the person to feel as if the actuator is not there. While the general components of such systems have been disclosed before, the art has not recognized that such a system can be used to reconfigure an exoskeleton between patient populations on the fly. Furthermore, where such systems are used, it is generally assumed that force sensing is required. Not requiring force sensing greatly reduces the complexity and cost of the exoskeleton.

Mechanical Hip Releasing Mechanisms Outside the Sagittal Plane

In accordance with a still further aspect of the invention, and in conjunction with some of the other disclosed embodiments, it is advantageous to allow the person wearing the exoskeleton to be in complete control of some of their motions outside the sagittal plane. In an exemplary embodiment, consider a four axis exoskeleton having powered control over the hips and knees of the patient wearing the device. If the patient is a stroke survivor and presents a predominantly hemiplegic injury (i.e., one of their legs is largely impaired and the other leg is not), the therapist might use the previously disclosed embodiment of having the controller minimize the effort the patient must use on their less affected leg. But, in most exoskeleton designs understood in the art, the other degrees of freedom at the hip—in the coronal and transverse planes—would be severely restricted. This is undesirable because the patient may become dependent on the exoskeleton for constraining these degrees of freedom. In these embodiments, mechanisms are provided that allow the other degrees of freedom about the hip to be selectively released so that the patient may control these degrees of freedom. Typically, a therapist will release these mechanisms manually; part of the advantage of the specific embodiments disclosed here is that the mechanisms may be locked and unlocked in seconds and without tools. This is important to the main environment where the device will be used, in the clinic, where the therapist may need to adapt the device between multiple patients, some of whom will have a right affected leg, some of whom will have a left affected leg, and others of whom will have both legs affected.

Figure 6:
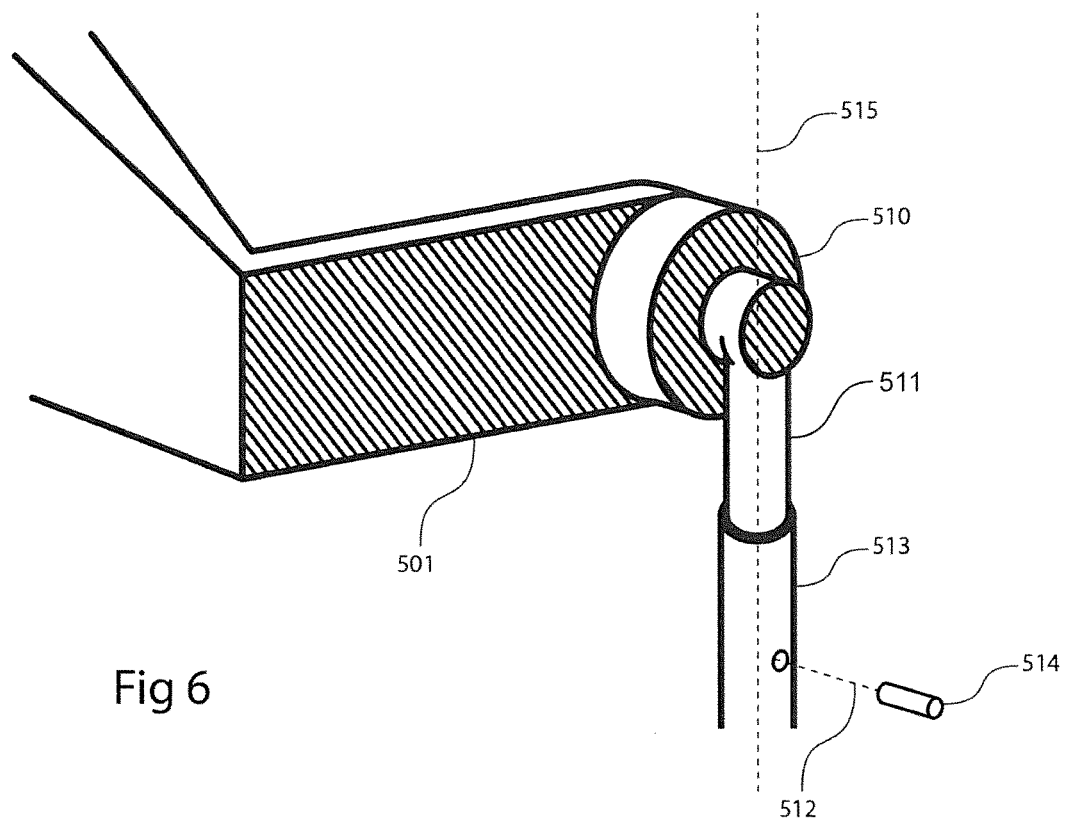
FIG. 6 illustrates an embodiment of a rotation locking arrangement employed between exoskeleton component links in accordance with the invention.

In a first and rather simple embodiment shown in FIG. 6, exoskeleton torso 501 incorporates hip actuator 510. Hip Actuator 510 torques thigh stub 511 relative to torso 501 as typically done in exoskeleton designs known to the art. In this embodiment, however, thigh stub 511 is inserted into thigh link 513 with rotary bearings which allow for rotation in the transverse plane about thigh rotation axis 515. Rotation locking pin 514 may be inserted through rotation locking hole 516 along rotation locking axis 512 in order to lock rotation between thigh stub 511 and thigh link 513. Thigh link further connects to the remainder of the exoskeleton leg, not shown in FIG. 6, that in a typical embodiment includes a thigh brace for connecting the person to the exoskeleton leg, a knee joint, a shank brace, and ankle joint, and a foot. In practice, a therapist could remove rotation locking pin 514 for one patient to allow the patient to control the rotation of the leg if that patient had sufficient strength, and could insert rotation locking pin 514 for another patient if that patient did not have sufficient strength to control the rotation of the exoskeleton leg. It is important to note that thigh rotation axis 515 is not generally coincident with the thigh rotation axis of the person. While co-locating the axes of rotation would be desirable, it is difficult to embody. However, the thigh rotation can be effective over a small range of motion, and it has been found that the effect of the axes of rotation not being aligned is not problematic over these ranges. In the preferred embodiment, the range of motion is −5 degrees to +30 degrees, where 0 degrees is straight forward and positive angles move the front of the foot away from the center of the body.

Figure 7:
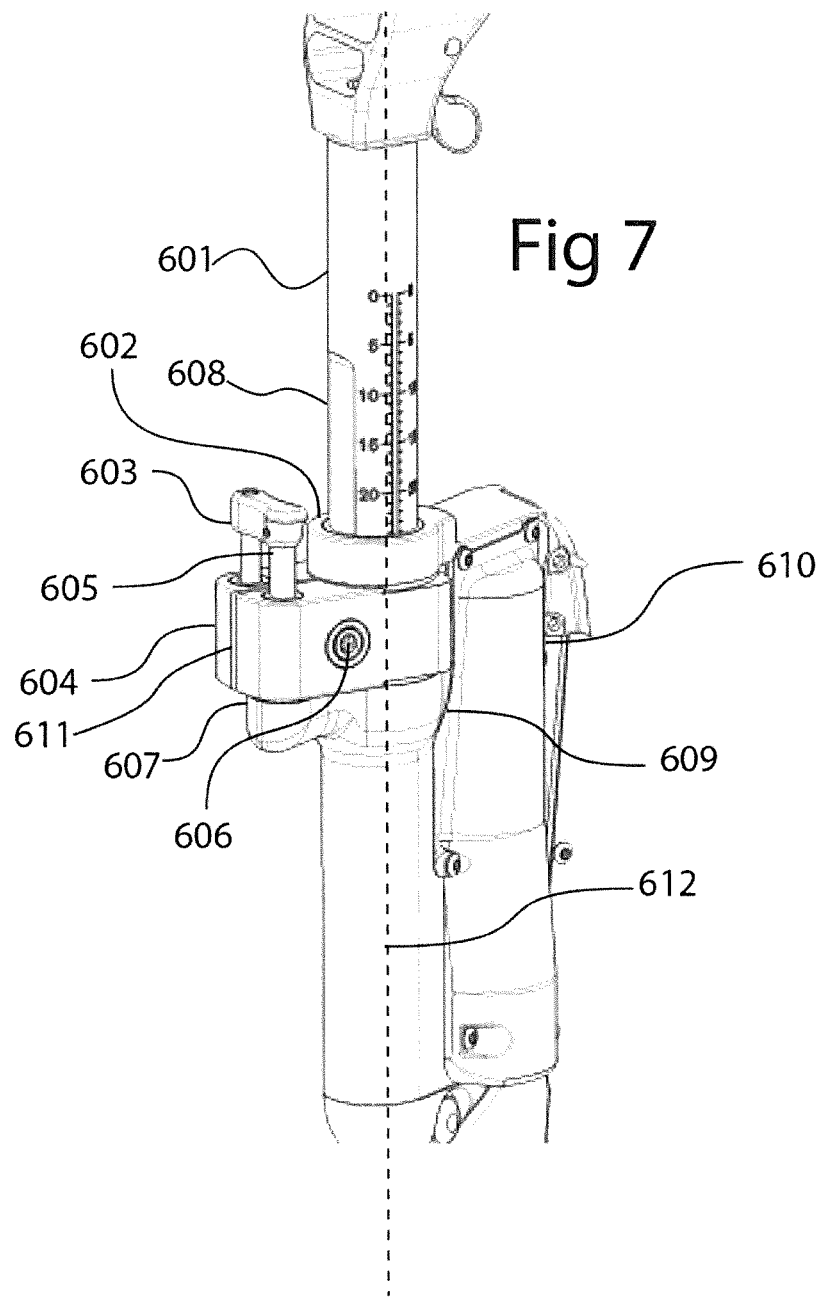
FIG. 7 illustrates another embodiment of a rotation locking arrangement employed between exoskeleton component links in accordance with the invention.

In accordance with another preferred embodiment, an exoskeleton joint is easily switched between fixed and freely rotating and includes an integral independently locking length adjustment. As shown in FIG. 7, this concept is represented with an exoskeleton joint between two exoskeleton links, thigh stub 601 and thigh link 610, in which thigh stub 601 includes a tubular section with a flat length adjustment groove 608 and thigh link 610 includes two correspondingly sized connection rings, upper ring 602 and lower ring 609, that freely slide on the tubular section of thigh stub 601. Lower ring 609 further includes rotational locking bore 607 which interfaces with rotational locking pin 605 within joint segment follower assembly 604. Joint segment follower assembly 604 has an internal "D" shape, the flat side of which interfaces with adjustment groove 608, preventing rotation between Joint segment follower assembly 604 and thigh stub 601. Sliding motion along axis 612 is controlled by opening and closing the split 611 of joint segment follower assembly 604 with locking screw 606. Follower assembly 604 additionally includes rotational release and locking lever 603 that mechanically engages and disengages rotational locking pin 605 in rotational locking bore 607. In practice a person adjusting the exoskeleton, often a physical therapist, can make two different adjustments:

1. By pulling rotational release and locking lever 603 up, rotational locking pin 605 is disengaged from rotational locking bore 607, and as a result joint segment follower assembly 604 and thigh stub 601 may rotate with respect to thigh link 610 about axis 612. By pushing rotational release and locking lever 603 down, thigh stub 601 and thigh link 610 are locked together in rotation.
2. By loosening fastener locking screw 606, joint segment follower assembly 604 is released from adjustment groove 608, and as a result thigh stub 601 may slide with respect to thigh link 610 along axis 612. Adjustment markings are provided to indicate the extent of this adjustment.

At this point it is important to note that, should rotational adjustment be desired between the shank and foot (i.e., roughly at the ankle), the same mechanism may be adapted for that embodiment. Furthermore, this embodiment has application in upper extremity devices, such as for the shoulder or wrist.

An additional embodiment includes a permanent elastic or damper connection between thigh stub 601 and thigh link 610. In this embodiment, when rotational locking pin 605 is disengaged, a spring or damper element remains engaged and provides some resistance to the rotation between thigh stub 601 and thigh link 610. In this configuration the joint can be switched from fixed to passive control rather than no control. This has the advantage of providing some resistance to motion so that the patient does not bear the full effort of controlling the leg. For example, in a typical embodiment, the spring would be sized to provide a restorative torque to keep thigh link 610 and the rest of the lower limb in the sagittal plane when that leg is in swing. In addition, when the person wearing the exoskeleton tries to turn the leg during stance, they could overcome the spring and cause the lower leg to rotate. Because this can induce oscillations in the leg at toe off (when the leg comes off the ground, the person loses much of the ability to push between the torso and the leg), it is advantageous to provide some slight damping to this motion to reduce oscillations.

In rehabilitative therapy there are many situations in which a therapist may want to be able to set degrees of freedom free or fixed. For example, in stroke rehabilitation it is desired to set additional degrees of freedom on the less affected side of the body free. Additionally, it may be desired to lock/fix degrees of freedom at the start of rehabilitation and once the patient reaches a certain level of recovery start to release degrees of freedom. In this way, this mechanical solution allows an exoskeleton to both provide acute therapy (with degrees of freedom locked) and chronic therapy (with degrees of freedom released as the patient progresses). The exoskeleton system can therefore progress with the patient as the patient recovers.

Figure 8:
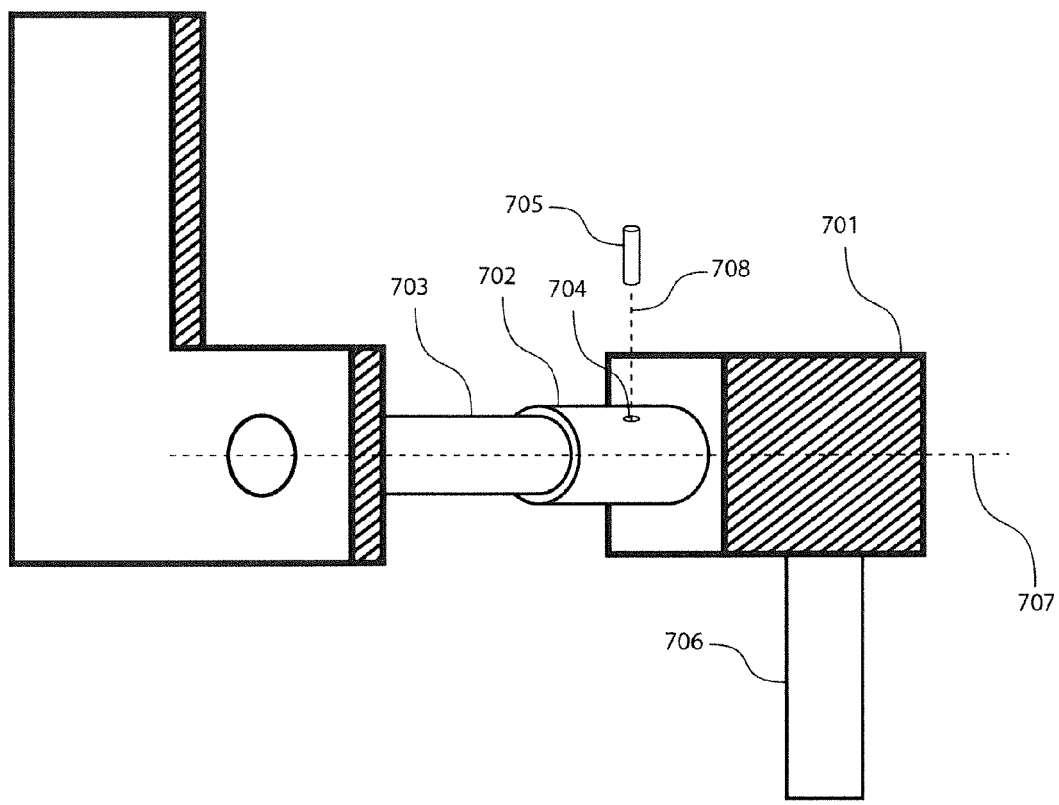
FIG. 8 illustrates a further embodiment of a rotation locking arrangement employed between exoskeleton component links in accordance with the invention.

In a further embodiment, it may be desired to allow the person to control the abduction and adduction of their leg about their hip in a manner analogous to the previous hip rotation embodiment. In a first and rather simple embodiment shown in FIG. 8, hip Actuator 701 torques thigh element 706 relative to pelvis stub 702 as typically done in exoskeleton designs known to the art. In this embodiment, however, pelvis stub 702 accepts torso link 703 with rotary bearings which allow for rotation in the frontal plane about thigh abduction axis 707. Rotation locking pin 705 may be inserted through abduction locking hole 704 along abduction locking axis 708 in order to lock rotation between pelvis stub 702 and torso link 703. Thigh element 706 further connects to the remainder of the exoskeleton leg, not shown in FIG. 8, that in a typical embodiment includes a thigh brace for connecting the person to the exoskeleton leg, a knee joint, a shank brace, and ankle joint, and a foot. In practice, a therapist could remove abduction locking pin 705 for one patient to allow the patient to control the abduction of the leg if that patient had sufficient strength, and could insert rotation locking pin 705 for another patient if that patient did not have sufficient strength to control the abduction of the exoskeleton leg. It is important to note that thigh abduction axis 707 is not generally coincident with the thigh rotation axis of the person. While co-locating the axes of abduction would be desirable, it is difficult to embody. It has been found that the thigh rotation can be effective over a small range of motion, and the effect of the axes of rotation not being aligned is not problematic over these ranges. In a preferred embodiment particularly applicable to clinical applications, the range of motion is −2 degrees to +22 degrees, where 0 degrees maintains the leg perfectly vertical and positive angles move the foot out from the center of the body.

Figure 9:
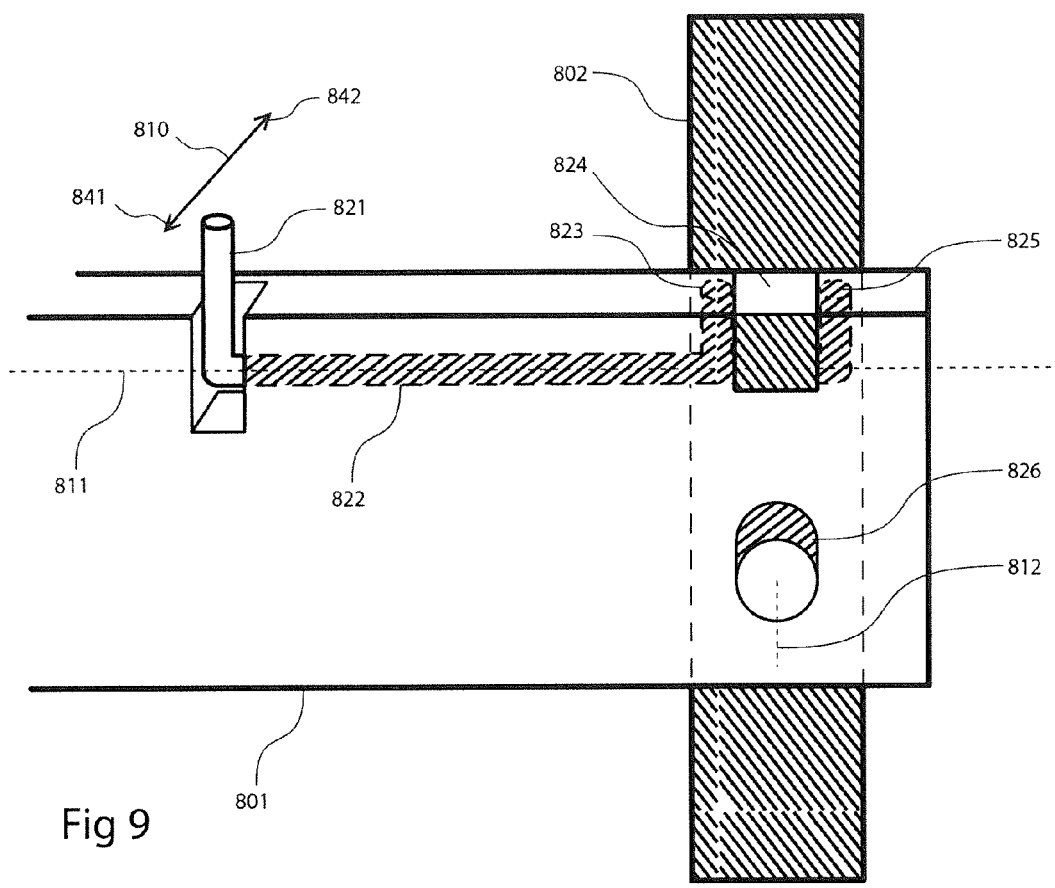
FIG. 9 illustrates an adjustment arrangement employed between exoskeleton component links in accordance with the invention.

The preferred embodiment for releasing abduction motion in the coronal plane, shown in FIG. 9 as a right hip assembly, facilitates simpler use. Pelvis bar 801, part of the torso which is not shown in this view, connects to thigh element 802 through pivot 826. For clarity, pelvis bar 801 is shown in FIG. 9 as transparent. Thigh element 802 further includes a connection to the thigh and lower leg, which are not shown here. Thigh element 802 includes adjustment stub 824, which engages the adjustment teeth 823 and 825 of adjustment link 822. Adjustment link 822 further includes adjustment lever 821. A person may move adjustment lever 821 along axis 810, in both unlocking direction 841 and locking direction 842. Doing so rotates adjustment link 822 about adjustment axis 811. It is to be understood that various bearing arrangements can be employed to support adjustment link 822 within pelvis bar 801 and to ensure that adjustment link 822 turns or rotates about adjustment axis 811, with ways to arrange such bearings being well understood in the art so as to be omitted here for clarity. As the person moves adjustment lever 821 in unlocking direction 841, adjustment teeth 823 and 825 disengage from adjustment stub 824, freeing thigh element 802 to pivot with respect to pelvis bar 801 about abduction axis 812. The result is that the patient wearing the exoskeleton is now controlling the motion of thigh element 802 about abduction axis 812. In the preferred embodiment, hard stops intersecting adjustment stub 824 are provided to prevent large motions about abduction axis 812 that could risk injuring the patient. When adjustment lever 821 is moved in locking direction 842, the adjustment teeth 823 and 825 engage adjustment stub 824, preventing motion between pelvis bar 801 and thigh element 802 about abduction axis 812. In some embodiments, springs and dampers may be configured between thigh element 802 and pelvis bar 801 so that the hip abduction is passively stabilized when unlocked.

In many embodiments, it is desirable to further provide adjustment of the abduction angle between the leg and torso when the abduction is locked. While this concept has been disclosed in the art, the embodiment shown in FIG. 9 provides a way to incorporate the adjustment into the locking mechanism, thereby producing a simpler design. In general, this may be achieved by sliding the entire adjustment mechanism along adjustment axis 811 so that the position at which thigh element 802 is held when the adjustment teeth engage adjustment stub 824 may be changed. In the embodiment shown in FIG. 9, adjustment stub 824 would have curved surfaces so that it would not bind against the adjustment teeth 823 and 825 in use. In some embodiments, although not diagrammed here, this is achieved by using a screw or lever to shift adjustment teeth 823 and 825 along adjustment axis 811. In accordance with the invention, this range of adjustment should typically be from −2 degrees (adduction, moving the foot towards the center line of the body) to +6 degrees (abduction, moving the foot away from the center line of the body). This arrangement would allow a physical therapist additional freedom to tune the range of motion of an exoskeleton joint to a user's particular needs.

Based on the above, it should be apparent that various arrangements have been disclosed which can be used either alone or in combination to enable any given exoskeleton to be reconfigured for varying uses, particular as a particular user advances during therapy. When used in combination, the various arrangements are complimentary and can provide for synergistic results. For example, while the unactuated leg first presented has free rotation in the transverse and coronal planes, it could readily be combined with the last embodiment that locks and unlocks those same rotations. Then a therapist configuring the unactuated leg could selectively fix or free those rotations. In another example, a single exoskeleton could incorporate all three main arrangements, including a swappable unactuated leg, lockable transverse and coronal hip rotations, and software controlled free joints, all of which can be generically classified as torque modifiers which enable a therapist freedom in configuring the device to maximize the benefit to the user. In any case, although described with reference to preferred embodiments of the invention, it should be apparent that various changes and/or modifications can be made to the invention without departing from the spirit thereof. Instead, the invention is only intended to be limited by the scope of the following claims.

We claim:

1. A lower extremity exoskeleton, configurable to be coupled to a person having distinctive right and left side body capabilities, said lower extremity exoskeleton comprising:
    asymmetrically controlled right and left leg supports configured to be coupled to the person's lower limbs, wherein each said leg support is configured to rest on the ground during a stance phase and includes a thigh link and a shank link interconnected by a knee joint; and
    an asymmetrically controlled exoskeleton torso configured to be coupled to the person's upper body and rotatably connected to each of said thigh links of said leg supports through respective sagittal hip joints; and
    a first torque modifier coupled across the knee joint of one of the right and left leg supports; and
    a second torque modifier coupled to the hip joint of the one of the right and left leg supports, wherein the first and second torque modifiers provide for distinct regulation of right and left side portions of the lower extremity exoskeleton to compensate for the distinctive right and left side body capabilities of the person, wherein another of the right and left leg supports includes a brake configured to resist flexion about a respective said knee joint during the stance phase.

2. The exoskeleton of claim 1, wherein the first and second torque modifiers constitute first and second torque generators and said exoskeleton further comprises:
    a plurality of sensors for monitoring an orientation of said exoskeleton including both of said leg supports; and
    a controller receiving signals from the plurality of sensors and regulating operation of said first and second torque generators to enable the lower extremity exoskeleton to follow a series of orientations collectively reproducing a natural human motion.

3. The exoskeleton of claim 2, wherein the knee joint and the hip joint of the another of the right and left leg supports is void of associated torque generators such that movement of said one of the right and left leg supports is actuated by the controller while the another of the right and left leg supports is unactuated.

4. The exoskeleton of claim 3, further comprising a disconnection arrangement between the right and left leg supports and the exoskeleton torso allowing said right and left leg supports to be selectively disconnected from said exoskeleton torso such that the exoskeleton torso can be reconfigured with either left or right actuated or unactuated leg supports.

5. The exoskeleton of claim 3, wherein the unactuated leg support includes a free pivot at said hip joint in a transverse plane.

6. The exoskeleton of claim 3, wherein the unactuated leg support includes a free pivot at said hip joint in a coronal plane.

7. The exoskeleton of claim 3, wherein the brake is electromechanical.

8. The exoskeleton of claim 2, wherein the right and left leg supports further include right and left foot links rotatably connected to the shank links of the right and left leg supports respectively, said foot links configured to rest on the ground during the stance phase.

9. The exoskeleton of claim 8, further comprising ankle resilient elements between said foot links and said shank links.

10. The exoskeleton of claim 1, wherein the first and second torque modifiers are selected from a plurality of joint modules and said exoskeleton further comprises a pair of mounting locations above and below each of the knee joint and the hip joint of the one of the first and second leg supports, wherein each said joint module is configured to be selectively mounted across a select pair of the mounting locations by a device operator whereby the device operator can chose a select combination of one or more of the plurality of joint modules in reconfiguring the exoskeleton to be advantageous to the walking of the person.

11. The exoskeleton of claim 10, further comprising:
    a plurality of sensors for monitoring the orientation of said exoskeleton; and
    a controller in communication with said sensors, said select pair of mounting locations further including an electrical interface configured to establish communication between a selected said joint module and said controller.

12. The exoskeleton of claim 11, wherein at least one of the plurality of joint modules constitutes a brake module including an electromechanical brake such that, when said brake module is mounted across a select one of the knee and hip joints, said controller may selectively arrest and release a motion of the select one of the knee and hip joints by engaging said electromechanical brake.

13. The exoskeleton of claim 11, wherein at least one of the plurality of joint modules constitutes a motor joint module including an electric motor actuator such that, when said motor joint module is mounted across a select one of the knee and hip joints, said controller can control a motion of the select one of the knee and hip joints through said electric motor actuator.

14. The exoskeleton of claim 10, wherein at least one of the plurality of joint modules constitutes a spring module including a spring such that, when said spring module is mounted across a select one of the knee and hip joints, said spring stores and releases energy over a range of motion of that joint.

15. The exoskeleton of claim 10, wherein at least one of the joint modules constitutes a damper module including a damper such that, when said damper module is mounted across a select one of the knee and hip joints, said damper absorbs energy over a range of motion of that joint.

16. The exoskeleton of claim 10, wherein each of said right and left leg supports further includes a foot link rotatably connectable to a respective said shank link through an ankle joint and configured to rest on the ground during the stance phase, said exoskeleton further comprising a pair of mounting locations above and below each said ankle joint so that a select one of said plurality of joint modules may be selectively mounted across said ankle joint.

17. The exoskeleton of claim 1, wherein the second torque modifier constitutes a lockable hip joint configured to allow rotation in the transverse or coronal plane between the one of the right and left leg supports and said exoskeleton torso when said lockable hip joint is unlocked and configured to resist rotation in the transverse or coronal plane between the one of the right and left leg supports and said exoskeleton torso when said lockable hip joint is locked.

18. The exoskeleton of claim 17, wherein the lockable hip joint is configured to be selectively locked and unlocked by a device operator, with motion of the hip joint of the one of the right and left leg supports being controlled entirely by the person throughout a range of motion when the lockable hip joint is unlocked and motion of the hip joint of the one of the right and left leg supports is prevented when the lockable hip joint is locked.

19. The exoskeleton of claim 18, wherein the lockable hip joint includes a resilient spring.

20. The exoskeleton of claim 18, wherein the lockable hip joint includes an energy absorber that resists motion.

21. The exoskeleton of claim 18, further comprising at least one stop limiting said range of motion.

22. The exoskeleton of claim 1, wherein said exoskeleton torso is provided with right and left mounting locations and each of the right and left leg supports further includes a pelvic stub configured to be selectively coupled to either of said right or left mounting locations on said exoskeleton torso by an operator of said exoskeleton to configure said exoskeleton in at least two ways: with said right actuated and said left unactuated leg support, and with said right unactuated and said left actuated leg support.

23. A method of controlling a lower extremity exoskeleton which is configurable to be coupled to a person having distinctive right and left side body capabilities and includes asymmetrically controlled right and left leg supports configured to be coupled to the person's lower limbs, wherein each said leg support is configured to rest on the ground during a stance phase and includes a thigh link and a shank link interconnected by a knee joint and an asymmetrically controlled exoskeleton torso configured to be coupled to the person's upper body and rotatably connected to each of said thigh links of said leg supports through respective sagittal hip joints, said method comprising:
regulating a first torque modifier coupled across the knee joint of one of the right and left leg supports and a second torque modifier coupled to the hip joint of the one of the right and left leg supports such that the first and second torque modifiers provide for distinct regulation of right and left side portions of the lower extremity exoskeleton to compensate for the distinctive right and left side body capabilities of the person, wherein the knee joint and the hip joint of another of the right and left leg supports is void of associated torque modifiers.

24. The method of claim 23, wherein the first and second torque modifiers constitute first and second torque generators and said method further comprises:
monitoring an orientation of said exoskeleton, including both of said leg supports, with a plurality of sensors; and
regulating, through a controller based on signals from the plurality of sensors, operation of said first and second torque generators to cause the lower extremity exoskeleton to follow a series of orientations collectively reproducing a natural human motion.

25. The method of claim 24, wherein the method further comprises actuating movement of said one of the right and left leg supports by the controller while the another of the right and left leg supports is unactuated.

26. The method of claim 25, further comprising: controlling an electromechanical brake of said unactuated leg support to resist flexion about a respective said knee joint during the stance phase.

27. The method of claim 23, wherein the first and second torque modifiers are selected from a plurality of joint modules and said exoskeleton further comprises a pair of mounting locations above and below each of the knee joint and the hip joint of the one of the first and second leg supports, said method further comprising: mounting a selected said joint module across a select pair of the mounting locations by a device operator whereby the device operator can chose a select combination of one or more of the plurality of joint modules in reconfiguring the exoskeleton to be advantageous to the walking of the person.

28. The method of claim 27, further comprising:
monitoring an orientation of said exoskeleton with a plurality of sensors; and
automatically upon mounting the selected said joint module, establishing communication between the selected said joint module and a controller through an electrical interface established by the select pair of mounting locations, thereby enabling signals from the plurality of sensors to be inputted to the controller.

29. The method of claim 28, wherein at least one of the plurality of joint modules constitutes a brake module, including an electromechanical brake, mounted across a select one of the knee and hip joints and said method further comprises: selectively arresting and releasing a motion of the select one of the knee and hip joints by engaging said electromechanical brake through the controller.

30. The method of claim 23, wherein the second torque modifier constitutes a lockable hip joint and said method further comprises: unlocking said lockable hip joint to allow rotation in a transverse or coronal plane between the one of the right and left leg supports and said exoskeleton torso; and locking said lockable hip joint to resist rotation in the transverse or coronal plane between the one of the right and left leg supports and said exoskeleton torso.

31. The method of claim 30, further comprising: locking or unlocking the lockable hip joint by a device operator, wherein motion of the hip joint of the one of the right and left leg supports is controlled entirely by the person throughout a range of motion when the lockable hip joint is unlocked and motion of the hip joint of the one of the right and left leg supports is prevented when the lockable hip joint is locked.

32. A method of controlling a lower extremity exoskeleton configurable to be coupled to a person and including: first and second leg supports configurable to be coupled to said person's lower limbs, wherein each said leg support comprises a thigh link and a shank link; two knee joints, each configured to allow flexion and extension between the respective shank link and the respective thigh link; an exoskeleton torso configurable to be coupled to said person's upper body, rotatably connectable to said thigh links of said leg supports through sagittal hip joints, said sagittal hip joints allowing for flexion and extension between said leg supports and said exoskeleton torso; two torque generators coupled to said knee joints; two torque generators coupled to said sagittal hip joints; a plurality of sensors for monitoring the orientation of said exoskeleton; and a controller in communication with said sensors and said torque generators, said method comprising:

sending signals from the plurality of sensors to the controller; and regulating the torque generators of the first leg support in a first mode to follow a series of orientations collectively reproducing a natural human motion, while regulating the torque generators of the second leg support in a second mode to minimize resistance of the second leg support to movements of the person, whereby the exoskeleton regulates motion of only one lower limb of the person.

33. The method of claim 32, further comprising:
receiving user input to said controller; and
based on said user input, altering regulation of the torque generators on each of the first and second support legs between the first or second modes.

34. The method of claim 33, further comprising, upon receiving said user input, checking the plurality of sensors, and verifying that said exoskeleton is in an orientation where it is safe to change the regulation of said torque generators between said first and second modes, before changing between said first and second modes.

* * * * *